Nov. 22, 1960  H. E. ADAMS  2,961,130
FUEL BOOSTER PUMPS
Filed Feb. 8, 1952  4 Sheets-Sheet 1

INVENTOR.
Harold E. Adams
BY
Moses, Nolte, Crews & Berry
ATTORNEYS

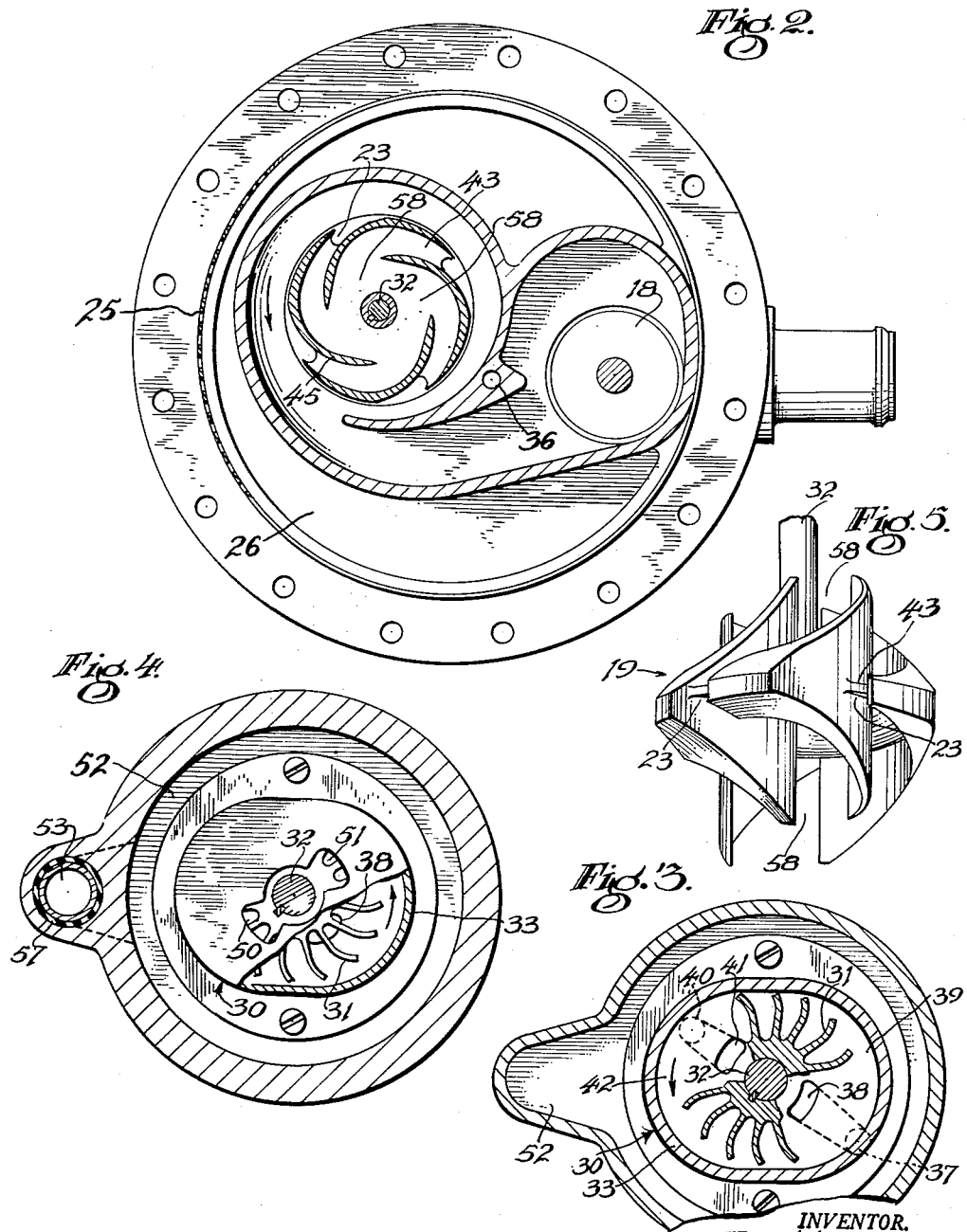

Nov. 22, 1960  H. E. ADAMS  2,961,130
FUEL BOOSTER PUMPS
Filed Feb. 8, 1952  4 Sheets-Sheet 3

INVENTOR.
*Harold E. Adams*
BY
*Moses, Nolte, Crews, & Berry*
ATTORNEYS

Nov. 22, 1960

H. E. ADAMS 2,961,130

FUEL BOOSTER PUMPS

Filed Feb. 8, 1952

INVENTOR.
Harold E. Adams
BY
Moses, Nolte, Crews & Berry
ATTORNEYS

United States Patent Office 2,961,130
Patented Nov. 22, 1960

2,961,130

FUEL BOOSTER PUMPS

Harold E. Adams, Norwalk, Conn., assignor to Nash Engineering Company, South Norwalk, Conn., a corporation of Connecticut Filed Feb. 8, 1952, Ser. No. 270,614

8 Claims. (Cl. 222—333)

This invention relates to fuel booster pumps for application to aircraft fuel tanks. Specifically, it involves a tank mounted booster pump for applications involving inverse gravitational acceleration and upside down flying.

In modern aircraft using volatile type liquid fuels, difficulty is encountered in delivering the fuel to the main engine high pressure fuel pump in a completely liquid form because of the vaporization of the fuel, which occurs during the rapid climb of the airplane to higher altitude. The presence of bubbles in the fuel would cause disturbance and possible failure of the main engine fuel system. This tendency to form bubbles and vapor pockets is overcome by the use of so-called fuel booster pumps. These fuel booster pumps are generally electric motor driven but can be driven by other means, such as hydraulic or air power. The pumps are usually mounted in the bottom of the fuel tank from which they take suction and deliver vapor-free pressurized fuel from their discharge to the main engine fuel system. Typical of such fuel booster pumps are the pumps disclosed in Patent No. 2,461,865, granted to me on February 15, 1949, for Pumps, and in Patent No. 2,581,828, granted to me on January 8, 1952, for Pumps.

With the continually increasing performance of modern aircraft and missiles, these units can climb and dive with high acceleration values, and they can maneuver in almost any flight attitude, including upside down attitudes. Under some of these conditions, the body of the fuel can move away from the suction connection of the conventional booster pump. When this happens, it of course stops delivery of fuel to the engine, with resultant sputtering or stalling of the engine.

Some of these typical flight conditions may be described as follows:

During a rapid climb, the main body of fuel will shift to the lower and after end of the fuel cell, and upon levelling off the maneuver may be executed so rapidly as to give the airplane "negative G" or a downward acceleration greater than gravitational acceleration. During this so-called "negative G" acceleration, the fuel in the cell will shift to a position generally in the top of the tank, thus exposing the normal booster pump suction to air only. In an outside loop maneuver, the fuel would likewise go to the top of the tank, and in a power dive it would shift to the after end of the tank. In a climb it would shift to the after end of the tank. In a glide or dive within the bounds of normal gravitational acceleration, the fuel will move to the forward end of the cell and, of course, on level flight, when the plane flies upside down, the fuel will shift to the top of the tank.

It has been the common practice to limit the shifting of the body of fuel in the cell by transverse bulkheads or trap tanks equipped with appropriate check valves. In response to the requirements of upside down flight, various designs of reserve and trap tanks, double-ended motors driving upper and lower pumps, weighted swivel suction connections, etc. have been used.

Most of the present day devices, however, add considerable weight and complication to the airplane and one object of the present invention is to provide required pumping service for these unusual flight attitudes with a minimum of added weight and of added complications.

In accordance with the present invention, provision is made of a double suction impeller, single outlet booster pump, together with special means for enabling it continuously to discharge fuel to the main engine system under all of these unusual operating conditions.

One object of this invention, therefore, is to provide a double suction impeller, centrifugal booster pump capable of handling the fuel requirements of both normal and inverted flight.

Another object of this invention is to provide a double suction impeller, centrifugal pump and an airplane fuel supply system capable of operating under "negative G" acceleration conditions.

Another object of this invention is to provide a single unit booster pump of the double suction impeller type, capable of pumping from either one, or both, of two fuel compartments.

Another object is to provide a single unit fuel booster pump of the double suction impeller type, capable of pumping from two elevations, either separately or simultaneously, whether the aircraft be upright, tilted or upside down.

Another object is to provide a single unit fuel booster pump of the double suction impeller type, capable of pumping from two elevations, either separately or simultaneously, and under conditions either of normal gravity acceleration or of negative gravity acceleration.

Another object is to provide a single unit pump of the double suction impeller type with two widely spaced suction intakes and capable of pumping full capacity with one suction intake uncovered.

Another object is to provide a single unit pump of the double suction impeller type, with two widely separated suction openings capable of delivering full capacity with one suction intake exposed to the air and the other suction intake below the associated eye of the impeller.

Another object is to provide a simple fuel supply system for aircraft, capable of continuously and automatically supplying fuel to the engine under all positions of the aircraft.

Other and further objects and advantages of the invention will hereinafter appear. In the drawing, forming part of this specification, Figure 1 is a longitudinal section of an illustrative pump unit employing features of the present invention;

Figure 2 is a sectional view taken on the line 2—2 of Figure 1, looking in the direction of the arrows;

Figure 3 is a plan sectional view taken on line 3—3 of Figure 1, showing the two-lobe construction of the vacuum pump with portions of the rotor broken away to show the separate inlet passages therefor;

Figure 4 is a sectional plan view taken on line 4—4 of Figure 1 and showing the outlet ports on the top of the lobe casing, one portion of the lobe casing being broken away to show the bottom inlet port;

Figure 5 is a perspective view of the impeller of the centrifugal liquid pump;

Figure 1:
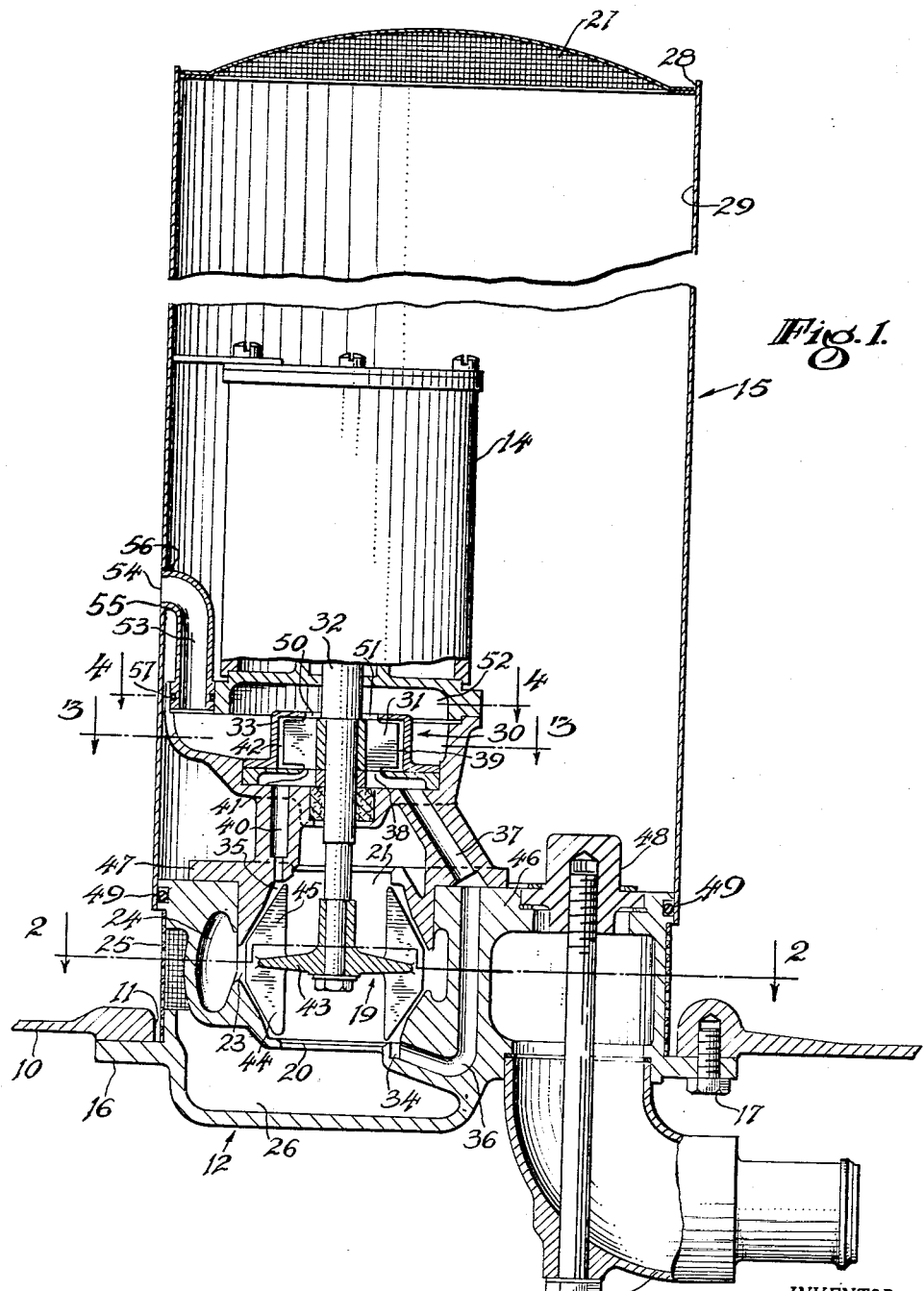

In Figure 1, the reference numeral 10 designates the bottom wall of an aircraft fuel cell with an opening 11, through which is inserted the pump and motor unit 12 of this invention. This unit includes the pump mechanism, the motor 14, and the top inlet stack 15. The pump is equipped with a base or mounting flange 16 that closes the opening 11, and is secured to the bottom wall 10 of the fuel cell by mounting screws 17.

The pump is basically similar to that of Patent No. 2,581,828. It includes a double suction impeller 19 having two inlet eyes 20 and 21 and a common outlet 23, discharging into the volute 24 and to the final discharge connection 18. The common outlet 23 includes both the constricted entrance to the volute 24 and the circular zone or throat which includes the passages between successive vanes and beyond the periphery of the web 43, through which the pumping chambers are free to communicate with one another.

One point of difference, as compared with the structure of Patent No. 2,581,828 is the location of the inlets to the pump. In this case, the bottom inlet is similar to that of the patent, the fuel flowing from the tank through the bottom strainer 25, the bottom inlet chamber 26 and bottom inlet eye 20 of the impeller 19. The top inlet differs from the showing of Patent No. 2,581,828 because of the extended inlet, the fuel entering from the tank through strainer 27, through top opening 28, and through conduit 29 formed by stack 15, and thence into the top inlet eye 21 of the impeller 19. The two inlet connections are isolated from each other and are placed at the extreme ends, respectively, of the pump. The distance between the two suction connections can be readily varied as required, by making the stack 15 as long as needed. The position of the motor 14 is immaterial. It can be located opposite the impeller suction 20 with the shaft extended in that direction and could even be located outside of the tank, with the shaft extending through the bottom of the pump 12.

The unit is equipped, as in Patent No. 2,581,828, with a gas removal vacuum pump 30, of the liquid ring type, and comprises a rotor having blades 31 secured to the shaft 32 for rotation therewith and enclosed in a two lobed casing 33.

Means are provided for withdrawing accumulated gas and vapors from within the impeller at the annular collecting grooves 34 and 35, through conduits 36 and 37 from the lower eye 20 to the one inlet port 38 of the lobe 39, and from the upper eye 21 through conduit 40 to the inlet port 41 of the lobe 42.

The liquid pump is of the double suction type, comprising a combined wheel hub and web 43 secured to the lower end of the shaft 32 for rotation therewith, and having affixed on opposite sides of the web, sets of impeller blades or vanes 44 and 45. These two sets of blades draw the liquid fuel to be pumped through the respective eyes 20 and 21. The web 43 divides the pump into two contiguous, merging chambers.

The pump, which is like the pump of Patent No. 2,581,828, has unusual features of construction which especially adapt it for the present service.

Each lobe operates independently of the other, as far as its suction connections are concerned, so that each lobe draws vapors and gases from one annular collecting groove, and the other draws vapors and gas from the other collecting groove. Since these two lobes are independent of each other, this construction is the equivalent of two separate vacuum pumps drawing independently from two separate annular gas collecting grooves. This feature of independent lobes with separate suction connections is important, because if the suction conduits of both annular grooves were joined together and then connected to a common vacuum pump, one or the other of the suction conduits leading to the respective annular groove would take more than its share of the total vacuum pump capacity at the expense of the other suction conduit. In other words, the suction of the vacuum pump would take the line of least resistance, and it would draw through the annular collecting groove that had the least resistance at the expense of the other annular groove. By separating the two, and connecting each suction conduit to its independent vacuum pump, there is attained full service for each of the annular gas collecting grooves, regardless of the condition of the other groove.

The upper flange 46 of the volute casing in conjunction with a mating flange 47, which supports the vacuum pump and motor, and the outlet bolt holding nut 48, form a liquid tight partition between the upper eye 21 and the lower eye 20 of the single impeller element 19. The upper suction stack 15 forms a pressure-tight joint with flange 46 by means of the O-ring gasket 49, and this stack forms a continuous leak-proof conduit 29 up to the top opening 28 of the stack 15, which is covered by a perforated strainer 27 to keep foreign particles from entering the pump.

The vapor discharge from the ports 50 and 51 of lobes 42 and 39 respectively enter the common chamber 52, whence they are conducted through the vapor discharge elbow 53 and finally to a point of discharge 54 outside of the stack 15. The vapor discharge elbow 53 is tightly sealed to an aperture 55, where it passes through stack 15 by brazing, as at 56, and is sealed where it engages the upper chamber 52 by means of O-ring gasket 57.

It will thus be evident that the vapors are removed from the upper eye 21 through collecting groove 35, channel 40, port 41 and lobe 42, independently of those taken from the lower eye 20 through collecting groove 34, channels 36 and 37, port 38 and lobe 39, and that all vapors are discharged to a point outside of the suction conduit 29.

Under normal operating conditions, the fuel level in the tank is above the upper inlet 28. Fuel enters the pump both through the upper conduit 29 and the upper impeller inlet eye 21, and through the lower strainer 25 and the lower impeller inlet eye 20. After removal of any vapor by the vapor removal pump 30, as described in Patent No. 2,581,828, the impeller discharges vapor-free fuel through the impeller outlet 23 to the volute 24 and the final discharge 18 to the fuel system.

When the plane in which this pump is installed is turned upside down, the fuel will shift to the top of the tank, thus leaving an air space in the tank bottom, and so exposing the eye 20 of the impeller 19. The pump of this invention, however, under these circumstances continues to pump through the other eye 21 and the conduit 29 by virtue of the continued priming action of the eye 21 by the lobe 42, coupled with the discharge sealing characteristics developed by the impeller 19. When in the upside down condition, therefore, the pump can continue to pump fuel from the tank through the strainer 27, even though the liquid level in the tank is below the elevation of the eye 21. It will continue to pump in this position until the fuel is pumped down to the now lower end of stack 15 and the opening 28 is uncovered.

It may seem paradoxical that the impeller 19 continues to pump from its lower, downward pointing entrance while its upward pointing entrance is exposed to air. In a conventional double suction impeller centrifugal pump, the presence of air in one eye to this extent would quickly break down the pumping action, and it would be unable to sustain a suction lift by the remaining eye.

The proportions of the impeller 19 passageways and the operating characteristics are quite similar to those described with reference to the pump of Patent No. 2,581,828 because this impeller has to perform the same function of separating the vapors from the fuel, delivering these vapors to the collecting rings 34 and 35 and discharging vapor-free liquid through the impeller discharge 23 to the volute 24.

Of added importance, however, to the present invention, is the maintenance of the relationship between the large entrance area to each impeller passage as compared to the final discharge area formed by the blades and casing. It will be noted that, as in Patent No. 2,581,828, the entrance portions 58 of the blades are capable of handling some three to four times the volume that can be discharged through the common peripheral outlet 23 of the impeller. This is caused by the greater than usual difference in flow areas between these two points, as well as the design of the approach and discharge angles of the impeller blades.

When one eye, say 20, is exposed to air, the set of blades of the impeller adjoining the eye 21 alone are capable of handling from 1½ to 2 times the total allowable discharge capacity of the common discharge ports 23. Inasmuch as this restricted area 23 can not discharge all of the liquid at the rate it is delivered, an annular pressurized ring of liquid is built up around the periphery of the impeller which extends into all the blade passages. The inner surface of this ring of pressurized liquid is located inside of the outer diameter of the central dividing wall 43 of the impeller 19. This maintained annular liquid ring, therefore, effectively seals off the one half of impeller 19 from the other half when it is uncovered or exposed to the air. This sealing action thus allows the vapor pump lobe serving the covered side to maintain its suction even if it has to lift the liquid from the suction inlet.

It might be at first assumed that, even though flow were maintained with only one eye operating, the flow obtained would amount to only one half the full flow of the pump when operated with both eyes submerged in liquid. This, however, is not the case, and it is primarily because of the built-in characteristics of this impeller whereby its suction passages have capacity to deliver three to four times as much volume to the pump as can be accommodated through the peripheral discharge passages of the impeller. Actually, the total discharge pressure generated by the pump as related to a given flow value is surprisingly little affected by the loss of the operation of one eye, because of the excess capacity which exists in the remaining operating eye of the impeller. There is a somewhat greater drop in pressure through the impeller, which is due to the greater frictional loss occurring as the same amount of flow goes through only one half section thereof. This pressure drop amounts to from 10% to 15% from the normal operating drop of the full impeller. This extra pressure drop can be anticipated in the design of the pump, making either the total capacity or pressure head of the pump some 10% or 15% greater than required. However, in aircraft maneuvers it is generally contemplated that the aircraft would operate at reduced power during "inverse G" or upside down flying and require even less fuel pressure than is available after the slight pressure loss experienced. Furthermore, in the case of direct current driven or air turbine driven motors, the loss of capacity of one eye could automatically result in a slight speeding up of the pump, which would cause it in effect to deliver practically full capacity with one eye only operating.

It will be observed from the foregoing that provision has been made of a centrifugal booster pump having a single impeller with a common outlet but equipped with suction connections divorced from each other and vertically set apart as desired. It will also be observed that this unit is capable of operation at practically full capacity with the uncovering of one of its suction connections, this even when the remaining suction connection is below the inlet of its associated impeller.

Aircraft installations embodying the invention will now be described. In these applications novelty is not claimed for dividing bulkheads, check valves, and trap tanks, per se, these devices being old in the aircraft art, but only for combinations of these devices with the disclosed pumping mechanism or its equivalent.

Figure 6:
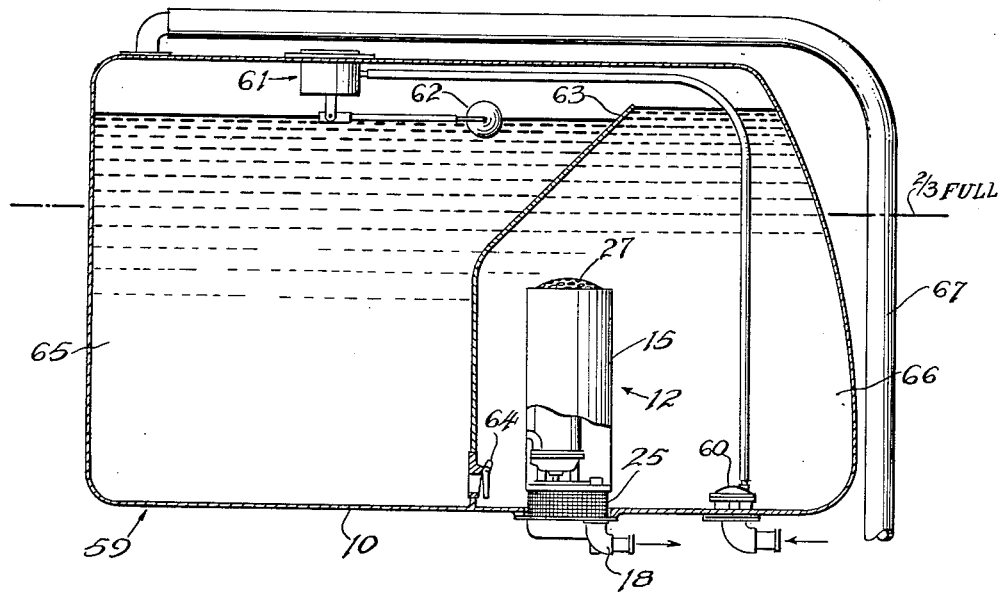
Figure 6 shows the application of the invention to a typical fighter aircraft main fuel tank.

The first application of the invention to military aircraft is shown in Figure 6. This figure shows the main fuel tank 59 of a typical fighter aircraft. This fuel tank is usually located in the main fuselage section of the airplane. There are other auxiliary fuel tanks built into the wing structure and in some cases also in the main fuselage. As a general practice, these auxiliary fuel tanks are furnished with individual or grouped fuel booster pumps which act as transfer pumps, pumping the fuel from the auxiliary tanks during flight into the main fuel tank 59. There are various systems of controlling the fuel transfer in accordance with the equilibrium requirements of the airplane. As a general thing, however, the auxiliary tanks discharge into a common manifold (not shown) which, in turn, is connected to a main fuel supply valve 60 located at or in the main fuel tank 59. This main fuel supply valve 60 is usually controlled by a pilot mechanism 61 located in the main tank, which is operated by a float 62. This controls the admission of fuel from the reserve tanks so as to maintain the main tank at a normal, full level. Since this mechanism is conventional the details are not illustrated.

The booster pumps in the auxiliary tanks are usually kept running during a flight and the fuel is used up from these reserve tanks first. The main tank, therefore, is maintained at a predetermined, normal degree of fullness during most of the flight. When the reserve fuel has been exhausted and the level in the main tank has been drawn down to approximately two-thirds full, there is usually some means of flashing a warning signal in the cockpit that the fuel supply is running out. In the normal operation of the fighter aircraft, therefore, the main fuel tank to which this invention would be applied is maintained continuously full, substantially until it is time for the pilot to be seeking a landing.

The main tank fuel booster pump is preferably placed in the after end of the tank 59. It is this pump that regularly discharges the fuel directly to the main engine fuel pump, and therefore it is this pump that must be relied upon for fuel supply during inverted flight.

In the arrangement of Figure 6, a transverse vertical partition 63 is provided which partially closes off an after portion of the tank 59. In the lower or bottom portion of this transverse partition one or more check valves 64 are provided. These check valves are normally open, or at least will swing open with the least pressure differential from the forward compartment 65 in the direction toward the after compartment 66. They will close with any fuel movement forward. The upper part of the partition 63 slopes aft to a point just to the rear of the vertical projection of the stack 15 which forms part of the booster pump unit of the invention, the pump unit being mounted just aft of this partition.

The top of the transverse partition 63 is located at a level just above the normal fuel level, as determined by the float 62, with space between it and the top of the tank to allow for free venting of the after compartment 66 and to allow for overflow of fuel from this smaller compartment into the main compartment 65 and, as will be seen later, for the free flow of fuel from the main compartment into the after compartment when flying upside down. A conventional vent pipe 67 communicates with the upper forward portion of the main compartment 65.

The fuel supply valve 60 is located in the after compartment 66, and fuel from this valve will generally fill this compartment first and overflow into the main compartment, although it may at times also flow at a low rate through the normally open check valve 64, provided there is little difference in level between the two tanks.

It will be noted that during a climb to altitude with the nose of the craft pointed upwards, the fuel in the main compartment 65 has ready access to flow through the check valves 64 into the auxiliary compartment 66, regardless of whether the main tank is full or only partially full. In a downward glide, however, the major portion of the fuel in the auxiliary compartment is prevented by the closing of the check valves and the shape of the partition from shifting into the main compartment. Sufficient fuel, therefore, is retained around the booster pump for continued pumping during this maneuver. During a power dive using an acceleration greater than gravity, or a "negative G," the fuel will back up into the auxiliary tank 66 through the check valves 64 in the transverse partition 63, and even possibly over the top of this partition, and will thus surround and submerge the pump. It is thus seen that during all of these various attitudes of flight, the booster pump is completely submerged.

When the plane flies upside down, or when a condition of downward acceleration exceeding gravitational force occurs, the fuel will shift generally to the top of both the main tank and the auxiliary tank. This will leave the inlet 26 to the eye 20 of the impeller uncovered but the fuel will still surround the inlet 27 to the eye 21 of the impeller, even under conditions of marginal operation where the main tank is only two-thirds full. Even under this marginal condition, it is possible for the pump to continue pumping fuel through the inlet 27 to the eye 21 until the tank has been pumped down to approximately the half full level. This is considered ample fuel capacity for the short period that upside down flying would be contemplated. Upon the resumption of a normal flying attitude the plane could fly for a longer time, as it would have available at least the capacity of practically one half the main tank.

This is one of the simplest applications of the invention to the usual fighter aircraft fuel system. It involves the minimum of weight and the minimum of complications.

Figure 7:
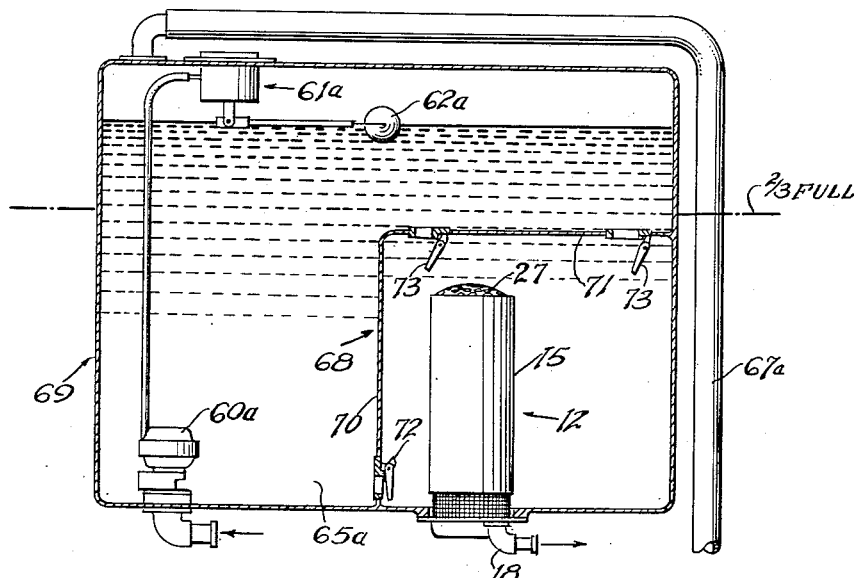
Figure 7 shows an application of the invention to a typical fighter aircraft system involving use of a separate trap tank.

Figure 7 shows the application of the invention to a so-called trap tank 68 located in the main fuel tank 69 of a fighter aircraft. In all of these illustrations, the main tank is maintained full until the reserve fuel is used up as explained in connection with Figure 5, and provision is made for flashing a warning to the pilot when his fuel gets down to two-thirds of the capacity of the main tank. It is not expected that upside down flying or other violent maneuvers would be conducted after getting down to this low in fuel.

In the illustration of Figure 7, the pump unit 12 of the invention is placed near the forward end of the trap tank 68, the trap tank being located in the after end of the main fuselage tank 69. The trap tank is separated from the main compartment 65a of the tank 69 by a forward vertical transverse bulkhead 70 and an upper horizontal transverse bulkhead 71. Check valves 72 are provided in the forward transverse bulkhead 70 of the trap tank for the same reasons that the check valves 64 are provided in Figure 6. The transverse bulkhead 70, however, does not extend near the top of the main tank 69 but to approximately five-eighths of the height of the main tank, and then it joins the transverse horizontal bulkhead 71 which forms the top of the trap tank.

In the top 71 of the trap tank 68 are installed check valves 73 similar to those located in the bottom of the forward bulkhead. These check valves are normally open, but when the plane turns upside down or there is a "negative G" condition, as soon as the fuel starts to flow through them, the valves close, thus retaining the fuel in the trap tank.

It will be noted that on each occasion of upside down flying, the trap tank holds sufficient fuel within the tank for the normal upside down maneuver. During this upside down period, as in the case of Figure 6, the inlet 26 to the eye 20 of the impeller is exposed to air, but the eye 21 of the impeller continues to pump fuel through the inlet stack 15. It will pump practically all of the fuel out of the trap tank 68 when in the upside down condition, or until the inlet stack 15 is uncovered. This arrangement provides, as indicated before, the same means for holding fuel in the trap tank during a downward glide and on all upward attitudes. In the case of "negative G" power dives, the trap tank is filled by fuel crowding into it from the main tank. During normal flight, fuel enters the trap tank through the bottom check valves, which are normally open, and it also may enter through the top check valves.

The use of the trap tank as compared to the open ended compartment of Figure 6, would allow the plane to operate in an inverted attitude with a still lower main tank level. This could be as low as one-third the height of the main fuel tank or, putting it in other words, as long as the fuel in the trap tank itself was better than one-half the height of the trap tank, the inlet 27 to the eye 21 of the impeller would be sufficiently covered to maintain pumping during an upside down or "inverse G" maneuver.

Conventional means for supplying fuel to tank 69 and for venting the tank are provided, the same as in Figure 6. Corresponding reference characters are applied to corresponding parts with the subscript a added in each instance.

Figure 8:
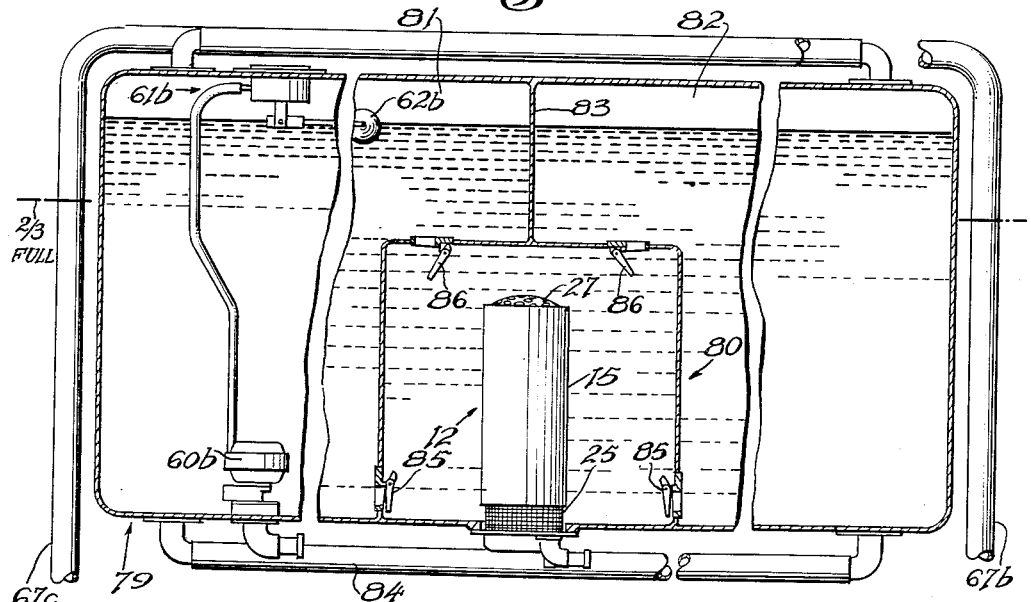
Figure 8 shows an application of the invention to a long main fuel tank with center trap tank.

Figure 8 illustrates the application of the pump unit 12 to a long main fuel tank 79, equipped with a center trap tank 80.

In installations where the long tank is required on fighter aircraft, an arrangement of this type can get the best utilization of the fuel by being located in the center, as illustrated. The main tank is divided into two sections 81 and 82 by a transverse bulkhead 83, complemented by the trap tank 80. An equalizing fuel line 84 is provided between the two compartments or sections 81 and 82 so as to maintain the normal full level in both tanks fed by the automatically controlled inlet valve 60b. Conventional vent lines 67b and 67c are provided for the compartments 81 and 82, respectively. The arrangement here disclosed prevents all of the fuel going to one end or the other with each inclination of the airplane, and holds at least half of the fuel available for pumping during an extreme angle, either up or down. The same provisions for upside down flying are made as in previous illustrations, the trap tank being provided with lower check valves 85 and upper check valves 86.

Figure 9:
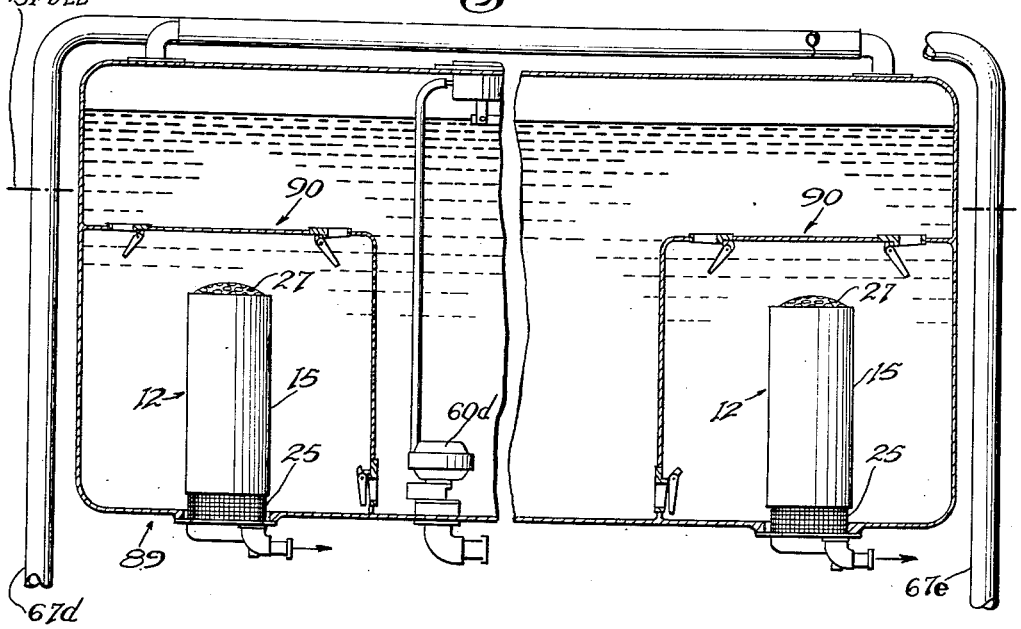
Figure 9 shows an application of the invention to a very long main tank with two trap tanks and pumps, as might occur on a missile.

Figure 9 covers an application of the invention to a very long tank 89, with two trap tanks 90 and two pump units 12. The installation shown is one that might occur in an extremely long aircraft or in a missile. In this case, the length of the tank 89 is such that the use of one pump in the central position would be impractical. The two pumps and the two trap tanks are provided at opposite ends of the tank 89, with both pumps discharging in common to the main engine or main manifold. Check valves (not shown) are provided in the individual pump discharge conduits to prevent the back flow of fuel into either pump in the event of its stoppage for any reason.

The fuel is supplied to the tank 89 through the usual float controlled, automatic valve 60d. Vent pipes 67d and 67e are provided for opposite ends of the tank 89.

With variation in attitude, either up or down, there is always at least one pump available for service, and in most cases both pumps are in full operating service.

The same provision for upside down flying is made here as in the previous arrangements.

I have described what I believe to be the best embodiments of my invention. I do not wish, however, to be confined to the embodiments shown, but what I desire to cover by Letters Patent is set forth in the appended claims.

I claim:

1. A double inlet immersion pump for delivering substantially gas free liquid comprising casing means defining a pumping chamber having an upper pumping portion and a lower pumping portion, and having a bottom inlet for said lower pumping portion and a top inlet for said upper pumping portion, an outwardly extending discharge passage therebetween, said chamber having peripheral walls sloping from each inlet outwardly to said discharge passage so as to provide a flaring surface section for each of said pumping portions, an impeller having a central impervious horizontal web wall and impeller blade portions extending outwardly at each side of said web wall into said upper and lower pumping portions, and cooperating with the peripheral walls, said casing and said impeller blade portions to restrict said discharge passage, said top and bottom inlets being formed to provide a flow passage area to the inlet of the blades of at least twice the flow area of said discharge passage, means to rotate said impeller to take liquid in at each of the top and bottom inlets and discharge it through said discharge passage, means to continuously remove gas and liquid having entrained gas therein from said pumping chamber in the area surrounding each of said bottom and top inlets, whereby to maintain a ring of liquid adjacent said web wall to seal from said discharge passage one of said inlets when it is exposed out of said liquid, a vertically elongated inlet passage means connecting said top inlet and extending vertically thereabove a considerable distance whereby to provide a top inlet opening at a location spaced a substantial vertical distance from said bottom inlet whereby to afford suction at widely spaced vertical locations regardless of the attitude of the liquid reservoir and the location of the liquid therein in which the pump is associated.

2. A double inlet pump according to claim 1 wherein the tips of said impeller blade portions and said housing diverge toward each inlet whereby to define an area of gas accumulation adjacent said inlets.

3. A double inlet pump according to claim 1 wherein said means to remove entrained gases include a liquid ring compressor having suction inlet means in communication with said bottom and top inlets.

4. A double inlet pump according to claim 1 including wall means defining a lobed pumping chamber above said pumping chamber, a rotor rotatable within said lobed pumping chamber and connected to said impeller for rotation therewith, at least one suction and one gas discharge located at the central portion of said rotor, a gas discharge passage connecting said gas discharge to the exterior of said pump, and suction passage means connecting the suction of said liquid ring compressor and each of said inlets whereby to continuously remove gas and liquid having entrained gas therein from said pumping portion.

5. In an aircraft fuel system, in combination, a fuel tank, a transverse bulkhead extending from the bottom of the tank to a point near to top thereof and dividing the tank into first and second compartments, a pumping unit disposed in the first compartment, said unit comprising a double inlet pump including casing means defining a vertically elongated central pumping chamber having a lower pumping portion with an associated bottom inlet and an upper pumping portion with a top inlet spaced from said bottom inlet, an outwardly extending annular discharge passage therebetween, said chamber having peripheral walls sloping from each inlet outwardly to said discharge passage whereby to provide a flaring surface section for each of said pumping portions, an impeller having a central impervious web wall and impeller blade portions extending outwardly therefrom at each side of said web wall into said upper and lower pumping portions and cooperating with the peripheral walls, said casing and said impeller blade portions to restrict said discharge passage, means to rotate said impeller to take fuel and associated entrained gas in at the top and bottom inlet and discharge it through said discharge passage, means to continuously remove gas and liquid fuel having entrained gas therein from said pumping chambers in the area surrounding said bottom and top inlet, said top and bottom inlets being formed to provide a flow passage area to the inlet of said blades of at least twice the flow area of said discharge passage, and together with said gas removal means to maintain a liquid fuel ring adjacent said impeller wall to seal one of said inlets from said discharge passage when this inlet is exposed out of said liquid fuel, a vertically elongated inlet passage means connecting said pump inlet and extending vertically in said first compartment whereby to provide a top inlet opening at a location spaced a substantial vertical distance from said bottom inlet to afford suction in said fuel tank regardless of the attitude of the tank and the location of the liquid therein, the spacing of the bulkhead from the tank top serving to permit the flow of fuel from the second to the first compartment during inverted flight and means providing for the passage of fuel from the second to the first compartment during normal flight.

6. In an aircraft fuel system, in combination, a fuel tank, a trap tank located at one end of the fuel tank of a substantial height but of somewhat less height than the full height of the fuel tank, a pump unit disposed in the trap tank, said unit comprising a double inlet pump including casing means defining a vertically elongated central pumping chamber having a lower pumping portion with an associated bottom inlet and an upper pumping portion with a top inlet spaced from said bottom inlet, an outwardly extending annular discharge passage therebetween, said chamber having peripheral walls sloping from each inlet outwardly to said discharge passage whereby to provide a flaring surface section for each of said pumping portions, an impeller having a central impervious web wall and impeller blade portions extending outwardly therefrom at each side of said web wall into said upper and lower pumping portions and cooperating with the peripheral walls, said casing and said impeller blade portions to restrict said discharge passage, means to rotate said impeller to take liquid fuel and associated entrained gas in at the top and bottom inlets and discharge it through said discharge passage, means to continuously remove gas and liquid having entrained gas therein from said pumping chambers in the area surrounding said bottom and top inlets, said top and bottom inlets being formed to provide a flow passage area to the inlet of the blades of at least twice the flow area of said discharge passage, and together with said gas removal means to maintain a liquid fuel ring adjacent said impeller wall to seal one of said inlets from said discharge passage when this inlet is exposed out of said liquid fuel, and vertically elongated inlet passage means connecting said pump inlet and extending upwardly in said trap tank whereby to provide a top inlet opening at a location spaced a substantial vertical distance from said bottom inlet to afford suction in said tank regardless of the attitude of the tank and the location of the liquid fuel therein, the trap tank being provided with ports and check valves in the top and bottom portions thereof to provide for transfer of fuel from the fuel tank to the trap tank during erect and inverted flight, but for intefering at times with fuel flow in the reverse direction.

7. In an aircraft fuel system, in combination, a fuel tank, a complete barrier across the fuel tank intermediate the ends thereof comprising a trap tank of substantial height but of somewhat less height than the full height of the fuel tank and a complementary transverse partition surrounding the trap tank, a pump unit disposed in the trap tank, said unit comprising a double inlet pump for pumping gas free liquid fuel including casing means defining a vertically elongated central pumping chamber having a lower pumping portion with an associated bottom inlet and an upper pumping portion with a top inlet spaced from said bottom inlet, an outwardly extending annular discharge passage therebetween, said chamber having peripheral walls sloping from each inlet outwardly to said discharge passage whereby to provide a flaring surface section for each of said pumping portions, an impeller having a central impervious web wall and impeller blade portions extending outwardly therefrom at each side of said web wall into said upper and lower pumping portions and cooperating with the peripheral walls, said casing and said impeller blade portions to restrict said discharge passage, means to rotate said impeller to take liquid fuel and associated gas in at the top and bottom inlets and discharge it through said discharge passage, means to continuously remove gas and liquid having entrained gas therein from said pumping chambers in the area surrounding said bottom and top inlet, said top and bottom inlets being formed to provide a flow passage area to the inlet of the blades of at least twice the flow area of said discharge passage, and together with said gas removal means to maintain a liquid fuel ring adjacent said impeller wall to seal one of said inlets from said discharge passage when this inlet is exposed out of said fuel, a vertically elongated inlet passage means connecting said pump inlet whereby to provide a top inlet opening at a location spaced a substantial vertical distance from said bottom inlet and extending upwardly in said trap tank to afford suction in said tank regardless of the attitude of the tank and the location of the liquid therein, the trap tank being provided with ports and check valves in the top and bottom portions thereof at each side of the bulkhead to provide for transfer of fuel from the fuel tank ends to the trap tank during erect and inverted flight but for interfering at times with fuel flow from the trap tank to the fuel tank ends.

8. In an aircraft fuel system, in combination, a fuel tank, trap tanks located in opposite ends of the fuel tank, each of substantial height but of somewhat less height than the full height of the fuel tank, a pump unit disposed in the respective trap tanks, each unit comprising a double inlet pump including casing means defining a vertically elongated central pumping chamber having a lower pumping portion with an associated bottom inlet and an upper pumping portion with a top inlet spaced from said bottom inlet, an outwardly extending annular discharge passage therebetween, said chamber having peripheral walls sloping from each inlet outwardly to said discharge passage whereby to provide a flaring surface section for each of said pumping portions, an impeller having a central impervious web wall and impeller blade portions extending outwardly therefrom at each side of said web wall into said upper and lower pumping portions and cooperating with the peripheral walls, said casing and said impeller blade portions to restrict said discharge passage, means to rotate said impeller to take liquid fuel and associated entrained gas in at the top and bottom inlets and discharge it through said discharge passage, means to continuously remove gas and liquid having entrained gas therein from said pumping chambers in the area surrounding said bottom and top inlets, said top and bottom inlets being formed to provide a flow passage area to the inlet of the blades of at least twice the flow area of said discharge passage, and together with said gas removal means to maintain a liquid fuel ring adjacent said impeller wall to seal one of said inlets from said discharge passage when this inlet is exposed out of said fuel, a vertically elongated inlet passage means connecting said pump inlet whereby to provide a top inlet opening at a location spaced a substantial vertical distance from said bottom inlet to afford suction in a tank regardless of the attitude of the tank and the location of the liquid therein, the trap tanks being provided with ports and check valves in the top and bottom portions thereof to provide for transfer of fuel from the fuel tank to the trap tanks during erect and inverted flight but for interfering at times with fuel flow from the trap tanks to the fuel tank.

References Cited in the file of this patent

UNITED STATES PATENTS

| | | |
|---|---|---|
| 1,488,388 | Hariveau | Mar. 25, 1924 |
| 1,845,136 | Dieter | Feb. 16, 1932 |
| 2,143,032 | Ruthman | Jan. 10, 1939 |
| 2,338,450 | Martin | Jan. 4, 1944 |
| 2,461,865 | Adams | Feb. 15, 1949 |
| 2,463,251 | Curtis | Mar. 1, 1949 |
| 2,531,980 | Johnson | Nov. 28, 1950 |
| 2,547,246 | Aspelin | Apr. 3, 1951 |
| 2,581,828 | Adams | Jan. 8, 1952 |

FOREIGN PATENTS

| | | |
|---|---|---|
| 1,001,193 | France | Oct. 24, 1951 |
| 636,531 | Great Britain | May 3, 1950 |